United States Patent
Terrell et al.

(10) Patent No.: US 6,371,275 B1
(45) Date of Patent: Apr. 16, 2002

(54) DUAL ENTRY-DOUBLE HELIX SPIRAL CHUTE

(75) Inventors: Jonathan D. Terrell, Louisville, KY (US); James L. Hanna, Millersville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/594,163

(22) Filed: Jun. 15, 2000

(51) Int. Cl.[7] .................. B65G 37/00; B65G 47/10; B65G 11/06
(52) U.S. Cl. ........................................ 198/367; 193/12
(58) Field of Search ................ 193/12, 13; 198/367, 198/778

(56) References Cited

U.S. PATENT DOCUMENTS

| | | | | |
|---|---|---|---|---|
| 1,074,387 A | * | 9/1913 | Schwab | 193/12 X |
| 1,090,948 A | * | 3/1914 | Mixter | 198/778 X |
| 1,194,098 A | * | 8/1916 | Viezzi | 193/12 X |
| 1,351,554 A | * | 8/1920 | Cowley | 193/12 X |
| 4,203,512 A | * | 5/1980 | Ammeraal | 198/778 X |
| 5,031,751 A | * | 7/1991 | Pahlsson | 198/778 X |
| 5,413,213 A | * | 5/1995 | Golz et al. | 198/778 |
| 5,887,699 A | * | 3/1999 | Tharpe | 198/367 |

FOREIGN PATENT DOCUMENTS

| | | |
|---|---|---|
| CH | 686 827 | 7/1996 |
| DE | 34 40 609 C1 | 8/1985 |
| EP | 0147 164 | 7/1985 |

* cited by examiner

Primary Examiner—Joseph D. Pape
Assistant Examiner—Patricia Engle

(57) ABSTRACT

A dual entry-double helix spiral delivery chute is provided which includes two spiral delivery chutes nested one above the other and being aligned with the same vertical axis. The two chutes are substantially identical in that they provide the same footprint as a single chute. Each chute, moreover, in addition to having an output port includes a top entry port and a side entry port downstream of the top entry port so that each chute can be served by two or more separate sorting machines receiving items from one or more separate sources.

20 Claims, 4 Drawing Sheets

DUAL ENTRY-DOUBLE HELIX SPIRAL CHUTE

BACKGROUND OF THE INVENTION

1. Field of the Invention

This invention relates generally to material handling apparatus and more particularly to a spiral chute for translating items from one level to another.

2. Description of Related Art

Declining chutes in the form of spirals is a component that is widely used in the material handling industry for conveying items from higher to lower elevations. Chutes are known to be fabricated from a variety of materials, including wood, metal, or plastics. In all cases, the chute is designed so that the items being handled will slide along a continuous conveying surface. Spiral chutes are generally known and are called spiral chutes because their edges and side walls form the shape of a spiral. Spiral chutes are specified by their degree of rotation, direction, width and inside radius. The degree of rotation, moreover, can be as large or as small as the particular application requires.

One such application comprises a system for air express parcel delivery. At the courier's airport facility, parcels are consolidated into aircraft containers based on their delivery destinations. The operators loading the containers, however, can only load at a certain rate, and may be responsible for loading more than one container. It is therefore necessary to have an accumulation device for each container to serve as a buffer and to collect the arriving parcels while the container is unattended. This requirement dictates a relatively long chute such as a 540° spiral having a constant inside radius so as to provide this functionality. Such a chute in effect forms a helix and has the advantage that it consumes less floor space than a straight chute.

SUMMARY

Accordingly, it is an object of the present invention to provide an improvement in material handling systems.

It is a further object of the invention to provide an improvement in spiral chute delivery apparatus.

It is yet another object of the invention to provide a spiral chute configuration that eliminates the requirement for presorting, provides system redundancy and reduces the footprint of the system.

These and other objects are achieved by material handling apparatus which includes a pair of spiral chutes having the same inside radius which are nested one above the other about the same vertical axis. In a preferred embodiment, the two spiral chutes are mutually rotated such that their entry ports face in opposite directions, i.e. 180°, relative to one another. With the two chutes superimposed about the same vertical axis, a double helix spiral chute configuration is provided. Moreover, each chute has a dual entry capability by including both a top entry port and a side entry port downstream thereof that allows each chute to be served from two or more sources, while providing a respective single output port at the discharge end of the chute. With the chutes being mutually rotated 180°, the side entry port of one chute can be located adjacent the top entry port of the other chute so that a single sorting machine can feed both chutes. The same arrangement allows another sorting machine to feed both chutes on the opposite side Such a feature eliminates the requirement for presorting, and provides system redundancy in the event that a sorting machine for one source is out of service. The double helix, dual entry delivery chute configuration according to the subject invention provides a component with which to fabricate an improved material handling system.

Further scope of applicability of the present invention will become apparent from the detailed description provided hereinafter. However, it should be understood that the detailed description and specific example, while indicating the preferred embodiment of the invention, is provided by way of illustration only, since various changes and modifications within the spirit and scope of the invention will become apparent to those skilled in the art from this detailed description.

BRIEF DESCRIPTION OF THE DRAWINGS

The present invention will become more fully understood when the following detailed description is considered in conjunction with the drawings which are provided by way of illustration only, and thus are not meant to be considered in a limiting sense, and wherein.

DETAILED DESCRIPTION OF THE INVENTION

Figure 1:
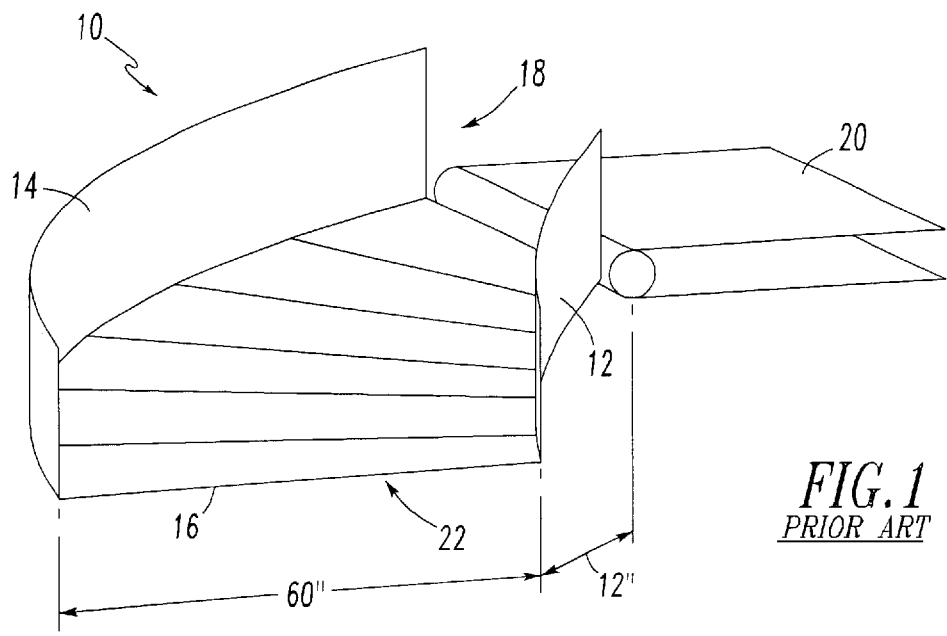
FIG. 1 is a perspective view generally illustrative of a left hand 90° spiral chute located at one end of a conveyor.

Referring now to the drawings wherein like reference numerals refer to like parts throughout, reference is first made to FIG. 1 wherein there is shown a conventional spiral chute 10 including inner and outer side walls 12 and 14 separated by a lower conveying surface 16. The chute 10 is designed so that items fed to an entry port 18 from a conveyor belt 20 are delivered to a discharge location, for example a receiving station, not shown, by way of an output port 22. Spiral chutes are specified by their degree of rotation, direction, width and inside radius. FIG. 1 depicts a left-hand spiral chute which is, for example, 60 inches wide and having a 12 inch inside radius. The degree of rotation can be as large or small as the particular application requires.

Figure 2:
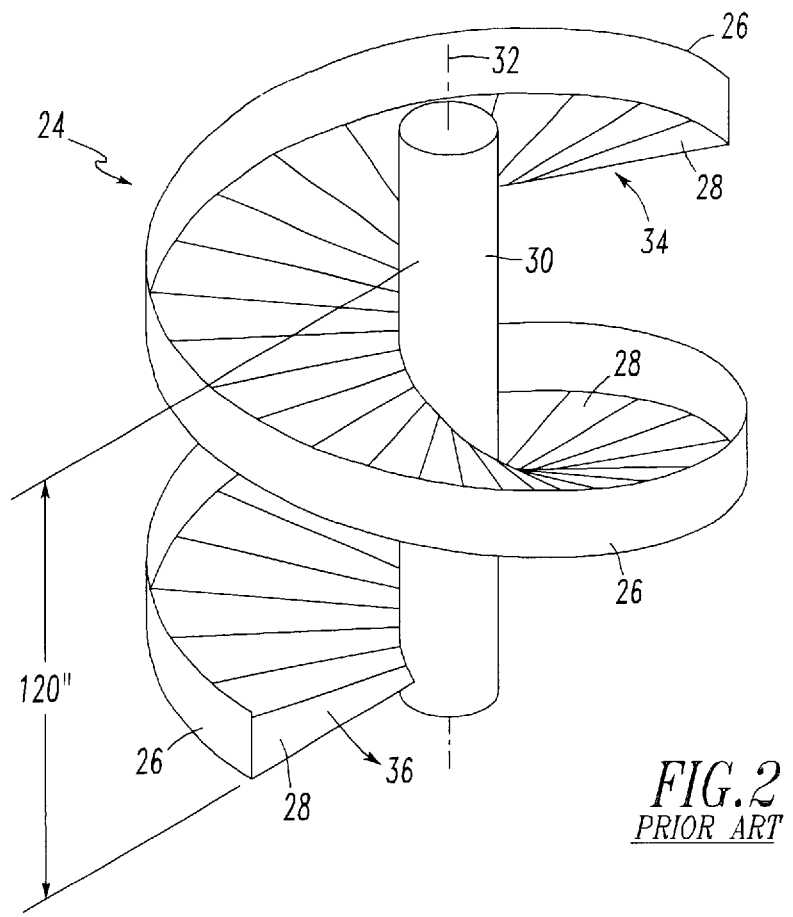
FIG. 2 is a perspective view of a 540° spiral chute for conveying items from one elevation to another.

Accordingly, FIG. 2 shows a spiral chute 24 having 540° of rotation. It includes an outer wall 26 and a conveying surface 28 which spirals around a hub 30 in the form of a helix which is aligned with a vertical axis 32. An entry port 34 is located at the top of the chute 24, while an output port 36 is located at the bottom or discharge end of the chute. The elevation change between the input port 34 and the output port 36 is shown, for example, comprising 120 inches or 10 feet. Thus, the chute 24 can be used to convey items downward 10 feet in elevation. Due to its significant length, however, it can also be used as a accumulation device for buffering items prior to downstream processing past the output port 36.

One such application for the spiral chute shown in FIG. 2 is for air express parcel delivery. The advantage of the spiral chute, such as shown in FIG. 2, is that it consumes less floor space and therefore has a smaller "footprint" than a straight chute.

Figure 3:
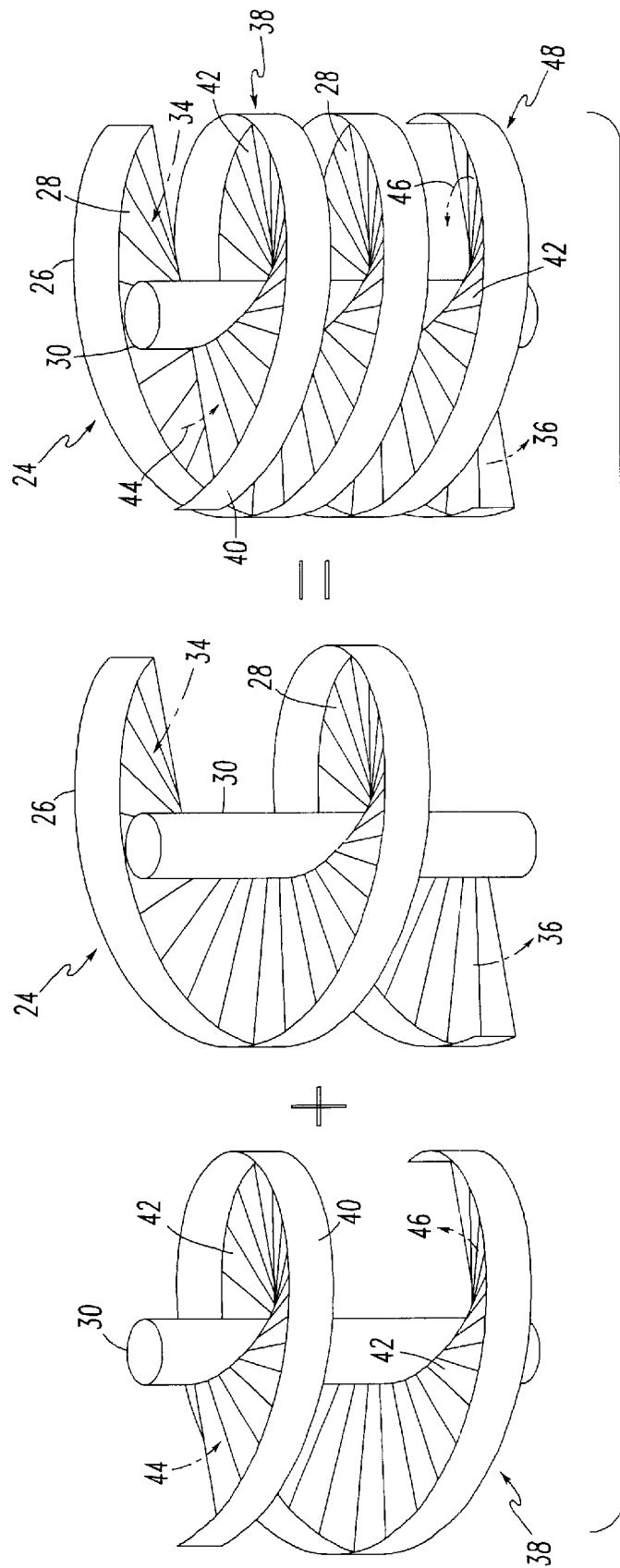
FIG. 3 is a perspective view illustrative of two 540° spiral chutes nested together with their top entry ports being separated by 180°.

A known improvement in this concept involves the nesting of two spiral chutes about the same vertical axis. Such a configuration is shown in FIG. 3 where a second 540 degree spiral chute 38 is located on top of the chute 24. The chute 38 consists of an outer wall 40 and a conveying surface 42, and having a top entry port 44 and an output port 46. Such an arrangement results in a composite double helix spiral chute configuration being provided as shown by reference numeral 48. It is to be noted, however, that in the double helix configuration 48 shown in FIG. 3, the two chutes 24 and 38 are mutually rotated 180° so that the two top entry ports 34 and 44 are rotated 180° with respect to one another as are the two output ports 36 and 46.

Figure 4:
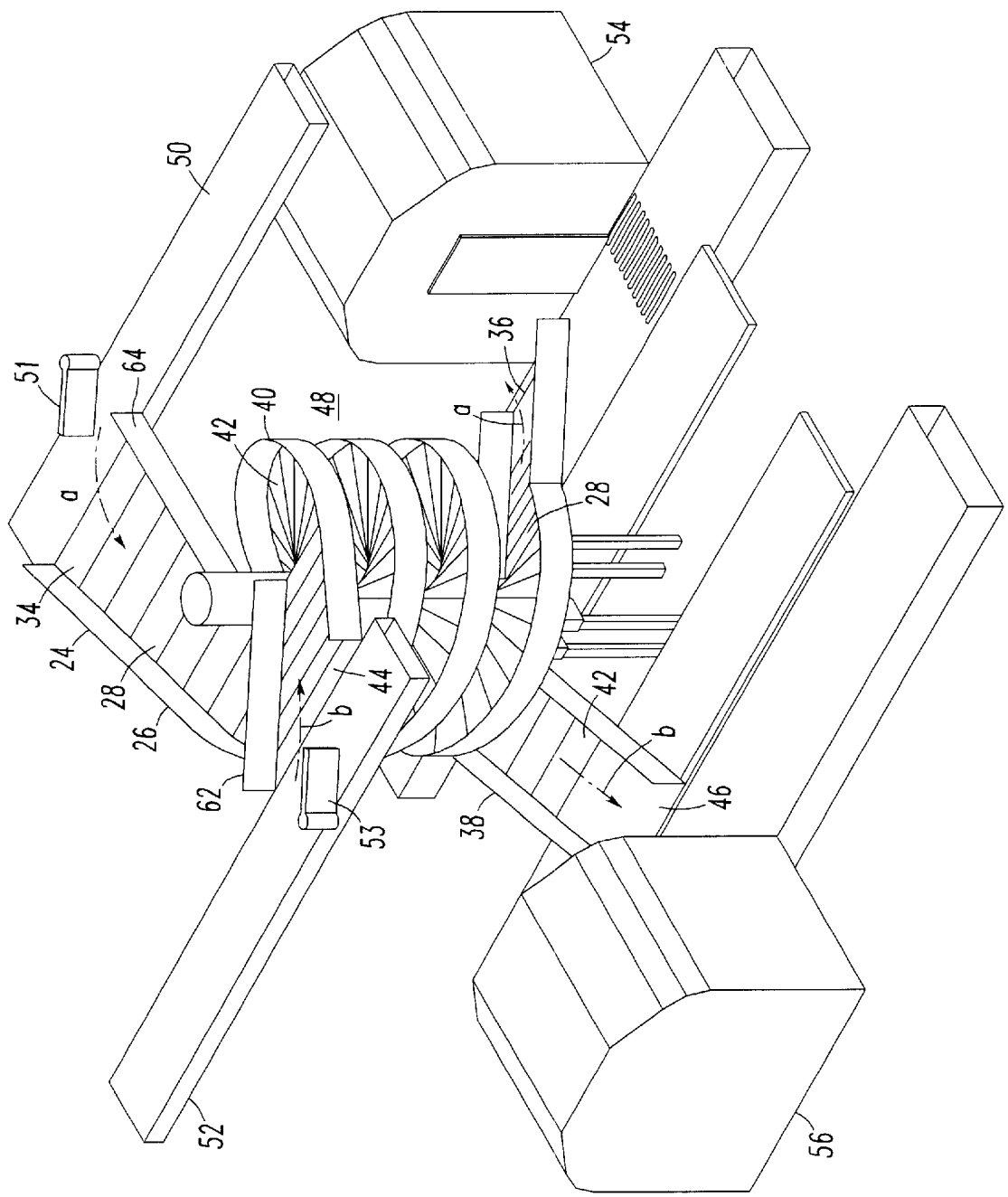
FIG. 4 is a perspective view of a material handling system utilizing the double helix spiral chute configuration shown in FIG. 3.

Such an arrangement has particular utility in a loading system such as shown in FIG. 4 where two separate sorting machines 50 and 52, also referred to simply as sorters, having respective diverter mechanisms 51 and 53, convey items in opposite directions from two separate sources, not shown. This type of material handling system is widely used in the automated and conventional sortation industry for loading a pair of containers 54 and 56 respectively located at the discharge ends of the two spiral chutes 24 and 38 as shown.

Further as shown in FIG. 4, the top entry input port 44 is located along the side of sorter 52 opposite the diverter mechanism 53. In a similar fashion, the top entry input port 34 of chute 24 is located to the side of sorter 50 opposite diverter mechanism 51. As shown in FIG. 4, the diverter mechanism 53 operates to divert items in the direction b where they enter the top entry input port 44 where they travel down the chute 38 to the discharge end at output port 46. In order that items diverted from the sorter 52 are not dumped onto the conveying surface 28 of chute 24, an inner side wall member 62 is located across from the diverter 53 at the input port 44.

In a similar fashion, an inner side wall member 64 is provided at the top entry port 34 of chute 24 to prevent items being diverted by the diverter 51 from falling onto the conveying surface 42 of chute 38 so that items being diverted in the direction a into the top input port 34 of chute 24 are directed to the discharge end including the output port 36. Thus each of the spiral chutes 24 and 38 connects to a respective sorting machine 50 or 52.

However, in the event that an item such as a package on conveyor 52 needs to be directed to chute 24 rather than chute 38, it must undergo a process known as "presorting". Otherwise, it must be resent via sorter 50 after it has been handled by the sorter 52. This latter process is called "rehandling". Presorting requires additional personnel and/or additional equipment. Rehandling acts to reduce the effective processing rate of the system, since equipment is utilized twice for handling the same item. Also, any given sorting machine can only process so many pieces in a given amount of time.

This deficiency resulted in the development of the subject invention whereby items being fed via the sorter 50 could also be diverted directly to chute 38 and where items being fed via sorter 52 could also be diverted directly to chute 24, whereby the costly processes of presorting and rehandling could be eliminated. This is not possible by the configuration shown in FIG. 4. This now leads to consideration of the preferred embodiment of the invention which is shown in FIG. 5.

Figure 5:
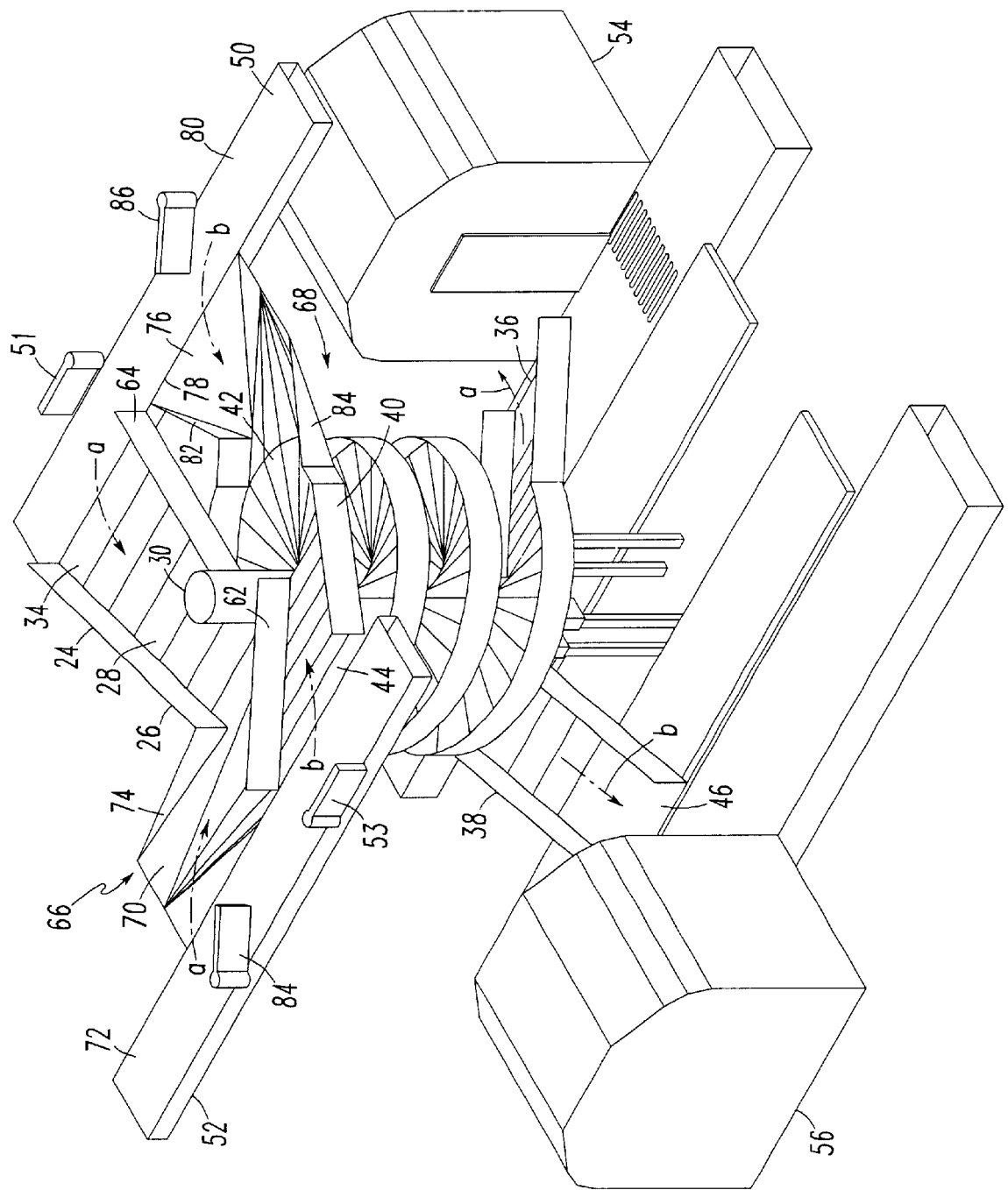
FIG. 5 is a perspective view of a material handling system including a dual entry-double helix spiral chute configuration according to the preferred embodiment of the invention.

Referring now to FIG. 5, the chutes 24 and 38 are now fitted with side entry input ports 66 and 68, respectively, which are formed in outer side walls 26 and 40 downstream of the top entry input ports 34 and 44. As shown, the side entry input port 66 for the chute 24 includes a downwardly sloping conveyor surface 70 from the top surface 72 of sorter 52 where it is joined to the chute conveying surface 28. The side entry input port 66 also includes a pair of downward angulating side walls, one of which is shown by reference numeral 74. In a like manner, the side entry port 68 includes a downward sloping conveyor surface 76 having a top edge 78 abutting the top surface 80 of the sorter 50. The downwardly sloping conveying surface 76 is joined to the conveying surface 42 downstream of the top entry input port 44. A pair of angulated side walls 82 and 84 help to guide items onto the spiral conveyor surface 42. It should also be noted that the sorter 52 includes a second diverter mechanism 84 is located forward of the diverter mechanism 53 and a second diverter mechanism 86 is located on sorter 50 forward of the diverter mechanism 51.

Thus what is provided is a system whereby items such as packages traveling in opposite directions on the sorting machines 50 and 52 can be diverted to either chute 24 and 38 by activation of the diverter mechanisms 53 and 84 on sorter 52 and diverter mechanisms 51 and 86 on sorter 50. For example, items being fed along the surface 80 of the sorter 50 can be diverted either into the side entry port 68 to chute 38 by activation of the diverter 86, or can be diverted into chute 24 by actuation of the diverter mechanism 51. In like fashion, items traveling on the surface 72 of the sorter 52 can be diverted to either chute 24 by activation of diverter mechanism 84 which diverts the items to the side entry port 66, or can divert items to chute 38 by activation of diverter mechanism 53 which diverts items to the top input port 44 of chute 38.

By designing the side entry ports 66 and 68 so that they interface with the outer radius, i.e., the outer walls 26 and 40 of the chutes 24 and 38 rather than interfacing with the cross section of the spiral, the structure of FIG. 5 does not disrupt the flow of items coming from the top of the chute. It should also be noted that the location of the side entry ports 66 and 68 can be made at any location along the outer walls 26 and 40 depending upon the intended application.

Thus with the addition of side entry input ports 66 and 68, items being conveyed via the sorting machines 50 and 52 can be diverted to both chutes 24 and 38, thus eliminating the requirements for presorting and/or rehandling. Furthermore, if either sorter including the conveyor and the respective diverter mechanisms is out of service, both discharge ends at output ports 36 and 46 can still be served by both chutes 24 and 38, thereby providing system redundancy.

The depiction of the sorting machines 50 and 52 shown in FIGS. 4 and 5 is for illustrative purposes only. It should be noted that, when desirable, the embodiments shown could utilize any available sorting technology including shoe sorters, cross-belt, tilt-tray, pop-up wheel, or other known apparatus.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

What is claimed is:

1. A material handling system including a pair of sorting machines carrying items from one or more sources for delivery to a pair of receiving stations, comprising:

two nested curved dual entry delivery chutes having a common vertical axis and located one above the other in relatively close proximity to the pair of sorting machines for selectively delivering items from either of said pair of sorting machines to either of said pair of receiving stations, each of said chutes including a first and a second entry port and a common output port, said first entry port being oriented toward one sorting machine of said pair of sorting machines and said second entry port being oriented toward the other sorting machine of said pair of sorting machines and wherein items diverted from both of said sorting machines can be selectively delivered to the same said output port, and wherein said output port of one of said chutes is located at a discharge end thereof adjacent one receiving station of said pair of receiving stations and said output port of the other of said chutes is located at a discharge end thereof at the other receiving station of said pair of receiving stations, whereby a requirement for presorting and rehandling of items being carried via the sorting machines is eliminated while at the same time providing redundancy in the event one of the sorting machines is not in service.

2. A material handling system according to claim 1 wherein said first entry port of each of said chutes comprises a top entry port located at one end of the chute and the second entry port comprises a side entry port located inwardly of said top entry port a predetermined distance downstream thereof.

3. A material handling system according to claim 2 wherein said two curved delivery chutes comprise spiral chutes for conveying items from a higher elevation to a lower elevation, and wherein said first entry port of each of said chutes comprises a top entry port located at one end of the chute and the second entry port of each of said chutes comprises a side entry port interfacing with an outer radius side wall of the chute at a predetermined location downstream of the top entry port.

4. A material handling system according to claim 3 wherein said spiral delivery chutes provide a double helix delivery chute configuration.

5. A material handling system according to claim 4 wherein both said delivery chutes are of substantially the same size so as to provide a common footprint.

6. A material handling system according to claim 5 wherein the delivery chutes are rotated 180° with respect to one another whereby the top entry ports face in opposite directions.

7. A material handling system according to claim 6 wherein the pair of sorting machines include respective item carrying elements and wherein the top entry port of one of said chutes and side entry port of the other of said chutes are oriented toward one of the item carrying elements for receiving items diverted therefrom and wherein the top entry port of the other of said chutes and the side entry port of said one chute are oriented toward the other item carrying element for receiving items diverted therefrom.

8. A material handling system according to claims 7 wherein said item carrying elements are located at a same upper level and the pair of receiving stations are located at a same lower level.

9. A material handling system according to claim 8 wherein both of said chutes comprise 540° spiral chutes.

10. A material handling system according to claim 1 wherein said pair of sorting machines include diverter mechanisms for selectively diverting items to said first and second entry ports.

11. A material handling system according to claim 8 and additionally including first and second diverter mechanisms on each of said pair of sorting machines for diverting items therefrom to the top entry port of one of said chutes and the side entry port of the other of said chutes.

12. A method of material handling, comprising:
conveying items from separate sources to a pair of nested curved delivery chutes, each chute having a top entry input port, a side entry input port and a common output port;
selectively diverting items from one of said sources to either the top entry input port of one chute of said pair of chutes and side entry receiving port of the other chute of said pair of chutes;
selectively diverting items from the other of said sources to either the top entry receiving port of the other chute of said chutes and the side entry receiving port of said one chute of said chutes;
delivering diverted items via the output port at a discharge end of said one chute of said pair of chutes to a first receiving station; and
delivering diverted items via the output port at a discharge end of said other chute to a second receiving station.

13. A method according to claim 12 wherein said delivery chutes comprise spiral chutes.

14. A method according to claim 13 and additionally including the step of arranging said spiral cutes in a double helix configuration.

15. A method according to claim 14 and additionally including the step of forming both side entry input ports in an outer side wall of said spiral chutes.

16. A method according to claim 15 wherein the top entry input port of both said chutes are located at the top end of said chutes and the side entry input ports of both said side entry input ports are located a predetermined distance inward of the respective top entry input port.

17. A method according to claim 16 wherein both of said chutes comprise chutes of substantially the same size so as to provide a common footprint.

18. A method according to claim 17 and additionally including the step of rotating one chute with respect to the other chute so that the top entry input ports thereof are located 180° apart from each other.

19. A method according to claim 17 and additionally including the step of rotating one chute with respect to the other chute so that the respective output ports are located 180° apart from each other.

20. A method of claim 17 wherein both of said chutes comprise 540° spiral chutes.

* * * * *